INVENTORS
HENRY H. ANDERSON
WALTER A. MILLER
BY
ATTORNEY

United States Patent Office 3,418,685
Patented Dec. 31, 1968

3,418,685
DURABLE EXTRUSION APPARATUS
Henry H. Anderson, Westfield, and Walter A. Miller, Somerville, N.J., assignors to Union Carbide Corporation, a corporation of New York
Filed Dec. 23, 1966, Ser. No. 604,219
11 Claims. (Cl. 18—12)

ABSTRACT OF THE DISCLOSURE

One or more bearing members are placed between a pair of movable die members, which members have heretofore been in sliding contact with each other, to absorb the wear of such contact and preserve the die members. The bearings can be employed with linear and tubular dies including a pair of tubular dies for extruding plastic net. A plastic distributor chamber is provided within the apparatus and the bearings are mounted wholly outside of the chamber so that there is virtually no plastic leakage between the die members. The relative rates of flow of plastic in the ducts of the die members can be controlled by restricting or enlarging the communication of the die ducts with the chamber.

---

Figure 1:
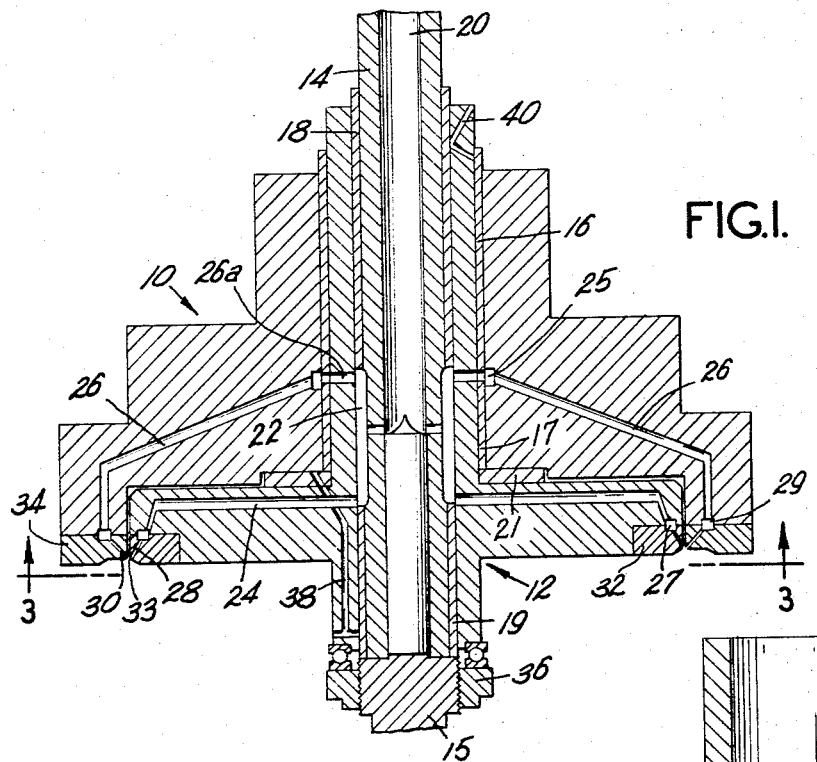

The invention relates generally to the extrusion of plastic articles and, more particularly to an improved apparatus for the extrusion of plastic articles from relatively displaceable die members.

Heretofore, a number of plastic articles have been extruded from relatively displaceable die members. For example, U.S. Patent 2,191,467 to Mercer describes an apparatus for extruding plastic net from a pair of relatively displaceable die members having a plurality of strand-forming extrusion nozzles therein. The two die members are movably mounted in sliding contact with each other and are driven so that the strands extruded from one die member periodically cross the strands extruded from the other die member, thus welding the strands together and forming a finished plastic net. A similar apparatus is described in U.S. Patent 3,067,084 to Nalle.

Since the displaceable die members in devices such as those described above are in sliding contact with each other and are often driven at considerable speeds, the die members usually have rather short lives due to wear on the sliding surfaces. Since the die members must be tooled to form the desired extrusion nozzles therein, they are usually costly to replace. Also, such frequent replacement naturally increases the down time of the particular machine involved.

It has been proposed to place an annular bearing ring between coaxially mounted inner and outer tubular net dies to absorb the wear therebetween. The ring thus located forms part the plastic feed chamber within the dies, which supplies the extrusion orifices of the dies and is held in place by the pressure of the molten plastic therein. The difficulty with such arrangement is that the bearing ring, being located out by the extrusion orifices, where the linear velocity is highest, instead of close by the central shaft of the dies, is subject to rapid wear particularly where large diameter dies are employed. Moreover, since the ring forms part of the plastic feed chamber it serves as a seal therefor and must be machined to close tolerances or it will allow leakage of molten plastic down onto the extrudate as it is extruded and foul it, particularly where the extrudate is plastic net. Machining to close tolerances is increasingly difficult and costly for large diameter bearing rings i.e., rings up to 12 inches diameter or more and the rapid wear on the ring soon causes faults in the seal in any event. Thus an extrusion apparatus having at least a pair of movable dies free from wear and damaging leakage, as outlined above, has heretofore not been available.

The present invention provides apparatus for extruding plastic articles from relatively displaceable die members with a minimum of wear on the die members and with virtually no leakage of the molten plastic feed material between the die members.

The present invention provides apparatus for producing extruded plastic articles comprising a pair of relatively displaceable die members, each of the die members having an array of extrusion orifices which are connected by a plurality of channels to a distributor chamber, at least one bearing for the die members serving to maintain the members a close distance apart and to absorb the wear as the members move relative to each other, the bearing being situated between the dies and wholly outside of the chamber, means for supplying pressurized molten plastic material to the chamber so as to extrude the plastic material through the orifices and means for relatively displacing the die members transversely to the direction of extrusion.

The invention will become more apparent from the following specification and drawings, in which FIGURE 1 is a sectional elevational view of an apparatus embodying the invention.

Figure 2:
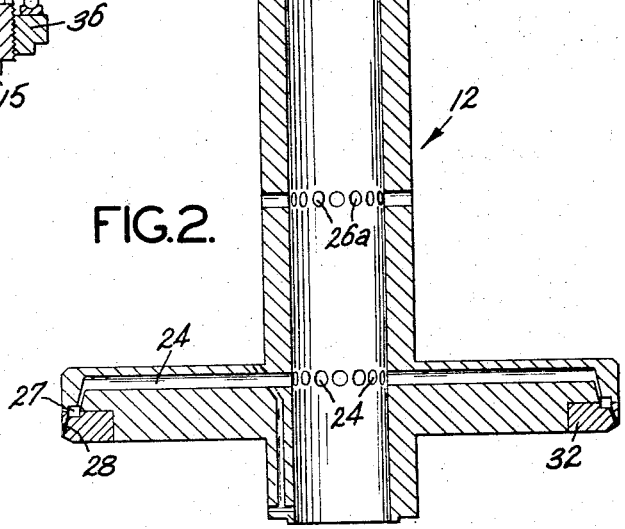
Figure 3:
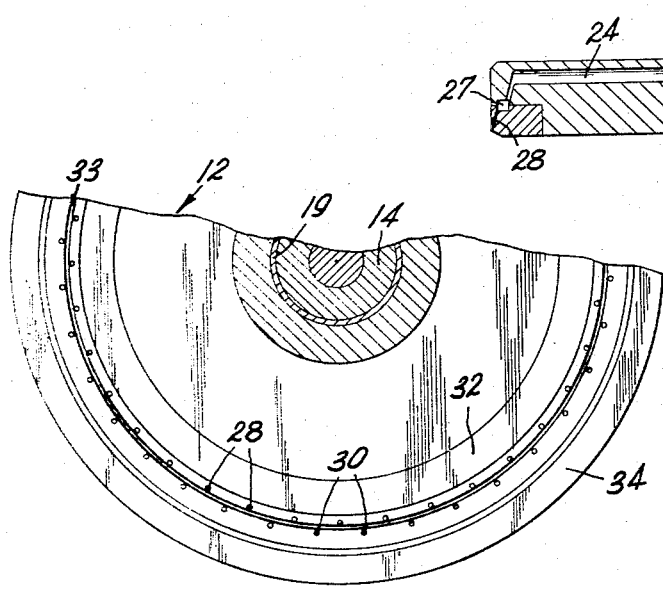

FIGURE 2 is a sectional elevation view of a portion of the apparatus of FIGURE 1; and FIGURE 3 is a fragmentary plan view of the apparatus of FIGURE 1, taken on line 3—3 looking in the direction of the arrows.

Referring now to the drawings, outer tubular die 10 and inner tubular die 12 are rotatably and coaxially mounted on stationary shaft 14 having a threaded end 15, as shown in FIGURES 1 and 3. Tubular dies 10 and 12 rotated (or oscillated) by conventional means (not shown) ride respectively on sleeve bearings 16, 17, 18, 19 and thrust bearing 21. Molten plastic is fed to the dies 10 and 12 by way of channel 20, and thence through annular distributor chamber 22 which communicates directly with inner die ducts 24 and connects with outer die ducts 26, by way of connecting ducts 26a and outer die annular groove 25 as shown in FIGURES 1 and 2. The plastic flowing in ducts 24 is collected in annular distributor channel 27 and extruded as thermoplastic strands from the inner die extrusion orifices 28 and the plastic flowing in ducts 26 is collected in annular distributor channel 29 and extruded as strands from the outer die extrusion orifices 30. The orifices 28 and 30, which are suitably arranged in a pair of concentric circles, as shown in FIGURE 3, are housed in removable annular die plates 32 and 34 and are preferably inclined toward one another as shown in FIGURE 1, so that the extruding strand forming streams can readily intersect and weld to form unitary integral net intersections proximate the dies 10 and 12. Die plates 32 and 34 are wholly separated from each other by space 33 as shown in FIGURES 1 and 3, and thus are free from sliding contact with any surface.

The plastic flow rate to the orifices 28 and 30 can be finely controlled by threaded collar 36 which can be rotated on the threaded end 15 of the shaft 14 to move the dies 10 and 12 up or down relative to the shaft 14, changing the effective length (and thus resistance) of flow through the distributor chamber 22 to ducts 24 and 26a respectively. In addition, the dies 10 and 12 can be moved by the collar 36 so as to partially close or choke either of the ducts 24 and 26a. The collar 36 can, of course, be locked at the position desired. Thus upward movement of the collar 36 and dies 10 and 12 can serve to choke connecting ducts 26a by raising them partially above the distributor channel 22 while downward movement thereof can serve to choke die ducts 24 in like fashion. Accordingly, the relative flow of molten plastic through the die ducts 24 and 26 can be closely regulated so as to extrude net strands of equal or, if desired, dissimilar size. Moreover, change of strand size and number can be augmented by replacing the die plates 32 and 34 with other die plates having the desired characteristics.

The annular distributor channels, 27 and 29 and annular groove 25 all serve to distribute the flow of plastic equally around their respective die portions so that the extruded strands from each die will be virtually uniform in size and density. Annular channel 27 is actually formed from two matching annular grooves cut respectively in the lower portion of inner die 12 and the upper portion of annular die plate 32, while annular channel 29 is similarly formed from two annular grooves cut in outer die 10 and die plate 34, as shown in FIGURE 1.

Drainage paths such as paths 38, 40 illustrated in FIGURE 1, are provided in the apparatus to remove any plastic seeping between the dies and bearings and to detour such seepage from contact with the extrudate.

By providing a bearing between the displaceable die members, this invention makes it possible to practically eliminate wear on the die members. When the bearing becomes worn, it can be quickly and inexpensively replaced compared with replacement of the tooled die members. In addition, since the die plates, e.g. die plates 32 and 34 of FIGURE 1, are separated they are subject to virtually no wear and can last indefinitely.

An important feature of the present invention is that the bearing or bearings, which are between the dies, are located wholly outside of the distributor chamber, such as chamber 22, FIG. 1. The pressure of the plastic in the chamber 22 is thus not directed full force at the bearings, such as bearings 16, 17 and 21 of FIGURE 1, so as to force considerable plastic seepage at a fault or worn spot therein and thus cause a leak between the dies which runs onto the extrudate. These bearings, as indicated, in FIGURE 1, are located proximate connecting ducts 26a, where the pressure is considerably less than in the chamber and little or no seepage occurs between the dies.

Although the bearings can be so closely fitted between the components of the apparatus that no plastic seepage occurs therebetween, a small amount of seepage is desirable to provide lubrication between the sliding surface—i.e. between each bearing surface and the surface in sliding contact therewith. Should any excess seepage develop between the dies it can be readily drained off before it reaches the extrudate by one or more drainage channels, such as drainage channel 38, for example, shown in FIGURE 1.

Another important feature of the invention is that, in the case of a pair of tubular dies, the bearings used to separate the dies are placed close to the axis of rotation, however large the diameters of the dies, minimizing wear as indicated by bearing 16, 17 and 21. Moreover, such bearings can be quite small in diameter due to their location near the axis of rotation and therefore can readily be machined to close tolerances, enhancing ease of replacement.

A further important feature of the invention is a means for regulating the relative plastic flow rates in the inner and outer dies and die orifices of an annular extrusion apparatus as indicated, for example, in FIGURE 1 and discussed above. As indicated, the dies 10 and 12 can be moved with respect to the shaft 14 and distributor chamber 22 to restrict or open ducts 24 and 26a. The relative size of the extruded net strands can be controlled by this method as well as by changing the die plates.

The bearing or bearings are made of a material softer than the surfaces in contact therewith, i.e. the bearings are softer than the dies and the shaft, where one is employed. For example, if the dies are made of steel the bearing can be made of a bronze or modified bronze, plastic, such as polytetrafluoroethylene, bronze and plastic, as well as carbon and graphite-copper combinations or any other suitable bearing material.

The apparatus of the invention includes linear dies as well as tubular or annular dies, i.e. tubular or linear dies separated by bearings as long as the bearings situated between the respective dies are located outside of the molten plastic distributor chamber or chambers of the dies.

The bearings employed in the apparatus of the invention, between a pair of dies or between a die and another apparatus component, such as between inner die 12 and shaft 14 of FIGURE 1, can be attached to one of the die members or floating free. Preferably each bearing is attached to one member and in sliding contact with another.

The extrusion orifices of the apparatus of the invention can be small and many so as to extrude linear or tubular plastic net or can be larger in size and less in number so as to extrude thermoplastic articles including sheet, film, piping or other articles. The apparatus can be converted from extruding one type of article to extruding another merely by replacing the die plates such as die plates 32 and 34 of FIGURE 1.

The tubular extrusion apparatus embodying the invention can have two or more principal component parts with bearings positioned between adjacent parts. The apparatus can have 2 principal parts, i.e., an outer die and an inner die which is affixed to a central shaft with a plastic inlet passage and distributor chamber being housed in the shaft and inner die. The apparatus can also have 3 or more principal parts of, for example, an outer die, an inner die and a central shaft as illustrated in FIGURE 1.

One distributor chamber or more can be employed in the apparatus of the invention. The chambers can be located within or attached to each die, located in one die and communicating with an adjacent die by means of ducts or, in the case of tubular or linear dies mounted on a central shaft, the chamber can be housed wholly or partially in the shaft and/or one or both of the dies.

As used herein the terms "plastic material" and "plastic mass" refer to:

(a) A synthetic thermoplastic resin capable of melt extrusion or compressing extrusion in a molten state through dies and settable by a cooling medium on issuance from the dies. Suitable thermoplastic materials include polyamides or superpolyamides, such as nylon; polyesters; vinyl polymers such as vinyl acetate polymers, styrene polymers, acrylonitrile polymers, vinyl chloride polymers such as polyvinyl chloride and copolymers of vinyl chloride with other ethylenically unsaturated monomers such as vinyl acetate, vinylidene chloride, and like monomers; polyolefins such as polyethylene, polypropylene, and like thermoplastic polymers.

(b) Natural or synthetic rubbers, subsequently vulcanized or containing vulcanizing agents.

(c) Those thermosetting plastic materials or mixtures thereof with thermoplastic materials, which are capable of melt extrusion.

(d) Natural and synthetic fiber-forming materials extrudable from solvent solution, such as cuprammonium cellulose or protein material (e.g. from soya bean), cellulose acetate, as well as many thermoplastic resins mentioned above, dissolved or dispersed in a solvent and capable of extrusion and setting by immersion in or spraying with a coagulant as the plastic mass emerges from the dies.

(e) Foamable compositions containing any of the above materials.

(f) Compatible and incompatible mixtures of any of the above materials.

What is claimed is:

1. An apparatus for producing extruded plastic articles comprising a pair of relatively displaceable die members, each of said die members having at least one extrusion orifice connected by at least one duct to a distributor chamber, at least one bearing for said die members serving to maintain said members a close distance apart and to absorb the wear as said members move relative to each other, said bearing being situated between said dies and wholly outside of said chamber, means for supplying pressurized molten plastic material to said chamber so as to extrude the plastic material through said orifices and means for relatively displacing said die members transversely to the direction of extrusion.

2. The apparatus of claim 1 wherein each die has a plurality of exrtusion orifices connected by a plurality of ducts to said distributor chamber.

3. The apparatus of claim 1 in which said extrusion orifices are situated in a plurality of removable die plates.

4. The apparatus of claim 1 wherein each die carries a plurality of extrusion orifices arrayed in a straight line, said lines being positioned in close substantially parallel array, and means are provided to reciprocate said dies relative to one another in parallel paths.

5. The apparatus of claim 1 wherein said die members are a pair of tubular die members coaxially and rotatably mounted on a shaft, said die members having respectively a multiplicity of extrusion orifices arranged in a pair of concentric circles and said bearing is a sleeve positioned between said dies in close contact therewith.

6. The apparatus of claim 5 wherein said die members have an annular thrust bearing mounted between said dies and proximate said sleeve, said thrust bearing resting on said inner die and supporting the weight of said outer die.

7. The apparatus of claim 5 wherein said dies are coaxially mounted on a shaft, said shaft having an inlet passage therein communicating with at least one distributor chamber.

8. The apparatus of claim 7 wherein said chamber is defined by the walls of said shaft and said inner die.

9. The apparatus of claim 7 wherein both of said dies rotate independently of said shaft and at least one bearing is positioned between said inner die and said shaft.

10. The apparatus of claim 9 wherein said chamber is an annulus defined by a wide annular groove cut around the outer side of said shaft, part of the surface of the axial bore of said inner die and portions of bearing sleeves on said shaft, said sleeves being positioned outside of said groove and proximate the boundaries thereof.

11. The apparatus of claim 10 wherein the inner die ducts communicate with said chamber proximate one of the groove boundaries and the outer die ducts communicate with said chamber proximate the other of said boundaries, and means are provided for moving the inner and outer dies longitudinally on said shaft so that each set of die ducts can be in turn moved at least partially beyond the groove boundaries adjacent thereto in order to selectively close off and open up said die ducts to the chamber and thus control the respective extrudate flow rates in the inner and outer dies.

References Cited
UNITED STATES PATENTS

| | | |
|---|---|---|
| 3,089,804 | 5/1963 | Gutierrez. |
| 3,291,879 | 12/1966 | Martin. |
| 3,349,434 | 10/1967 | Hureau. |
| 3,358,329 | 12/1967 | Martin et al. |

WILLIAM J. STEPHENSON, *Primary Examiner.*